UNITED STATES PATENT OFFICE 2,228,027

PROCESS FOR THE CATALYTIC CONVERSION OF OLEFINS TO ALCOHOLS

Franklin A. Bent, Russell W. Millar, and Simon N. Wik, Berkeley, Calif., assignors to Shell Development Company, San Francisco, Calif., a corporation of Delaware No Drawing. Application June 13, 1938,
Serial No. 213,450

5 Claims. (Cl. 260—641)

This invention relates to the manufacture of alcohols from normally gaseous olefins and more particularly to the production of water soluble alcohols from the corresponding olefins. It is concerned with the direct hydration of olefins by contact with hydration catalysts at elevated temperatures and pressures and provides an improved procedure for carrying out such hydrations whereby the efficiency of the entire system may be increased and the cost of the alcohol produced materially reduced.

One object of our invention is the provision of a process for the catalytic hydration of olefins in which the conversion of olefin per pass may be maintained at a higher value than is practicable by prior methods. Another object of our invention is to more completely recover the alcohol produced from the other components of the converter effluent and to reduce the amount of alcohol recirculated to the converter with the unreacted olefin. Still another object of our invention is to eliminate losses of unreacted olefin in the reaction products. It is a further object of our invention to employ a liquid-liquid extraction system for the most efficient recovery of olefin hydration products. Our invention also resides in the control of alcohol content of the olefin fed to the catalytic converter so that it is maintained below a maximum beyond which greatly decreased yields of alcohol are obtained under otherwise identical conditions. The process of our invention may be considered a further improvement on the procedure described in our United States Patent 2,010,686.

With the olefin hydration catalysts available, thermo-dynamic considerations show that even under the best conditions obtainable in industrial practice, only relatively small amounts of alcohol will be present in the reaction products. Any alcohol returned with the feed to the converter materially reduces the per pass conversion. Where the usual conversions of the order of 2 to 6% only are being obtained the recycling of olefin containing a material amount of the alcohol produced greatly reduces the plant capacity. In spite of this, prior workers in this field have relied solely upon condensation methods, particularly partial condensation methods for the recovery of their alcohols. Such methods are not, as a practical matter, capable of either efficient or thorough removal of alcohol from hydrocarbon mixtures such as are obtained in the catalytic hydration of olefins.

We have found, moreover, that the recycling of alcohol to the converter with the unreacted hydrocarbon has a detrimental effect upon the subsequent conversion, and, more specifically, that the conversion of propylene and/or ethylene to the corresponding alcohol may be materially increased by using a feed to the catalytic chamber in which the molar ratio of alcohol to olefin is not more than about 0.010 to about 0.050. Furthermore, we have found that these low alcohol contents may be economically maintained during continuous operation without sacrifice of unreacted olefin by extraction of the hydrocarbon phase of the condensate obtainable by substantially totally condensing the converter effluent, using an aqueous solvent for the alcohol.

For the purpose of making our invention more clear it will be described with more particular reference to the catalytic hydration of propylene by passing propane-propylene fractions thru aqueous sulfuric acid of about 2–10% concentration at temperatures above 150° C. and under a total pressure of the order of about 3000 pounds per square inch. It will be understood that these conditions are illustrative of one preferred method of operation only and that other catalysts at the same or other temperatures and/or pressures may be used in the process of our invention. The organic nitrogen base salts described in U. S. Patent 2,036,317, for example, are particularly suitable non-corrosive hydration catalysts. Another advantageous type of catalyst which may be used in our process is the sulfates and halides of metals of Group II of the Periodic Table such as are described in U. S. 2,107,515. Solid hydration catalysts which may also be used are metals or suitable metal compounds, for example, those described in United States Patents 1,999,620, 2,055,269 and 2,057,283. In all cases we prefer to employ temperatures above 100° C., and, particularly where aqueous hydration catalysts are used, temperatures below the critical temperature of water. Also under such conditions we prefer to operate at pressures at least sufficient to maintain water in the liquid phase at the operating temperature but even higher pressures are preferred. A wide range of olefin to water ratios are permissible in the feed. In many cases molecular excess of olefin over water is desirable. It is an advantage of aqueous hydration catalysts, that uniformity of operation may be easily, and if so desired automatically, achieved by controlling the water addition in response to changes in the level of the catalyst solution so that the concentration and volume of catalyst is maintained substantially constant.

As applied to the production of isopropyl alcohol from propylene, one very simple method for carrying out the process of our invention comprises feeding propylene containing hydrocarbon together with water, preferably in the liquid phase for ease of control altho steam may be used, into contact with a hydration catalyst in a suitably heated converter, capable of withstanding elevated pressures, maintained at a temperature at which hydration of the propylene takes place. The gaseous mixture issuing from the catalytic chamber and containing isopropyl alcohol, water vapor, unconverted propylene and propane is condensed by cooling, preferably to about 20–30° C. under the operating pressure and run into a separator maintained under at least the vapor pressure of the mixture at the condensation temperature whereby two liquid phases separate. The lower layer containing isopropyl alcohol in the form of an aqueous solution, is drawn off and distilled or otherwise suitably processed for recovery of its alcohol content. The upper layer will contain principally propane and unconverted propylene together with a substantial amount of isopropyl alcohol. This layer is transferred without substantial reduction in pressure to a suitable extractor such as a packed column or the like in which it is washed with cold water or other suitable solvent for isopropyl alcohol which is substantially immiscible with liquid propylene. In this operation the alcohol content of the hydrocarbon is reduced to preferably at least 0.03 mol per mol of olefin and more preferably to a ratio of not more than 0.003 to 0.010 mol per mol of olefin. The extract may be treated along with the previously mentioned aqueous phase or separately processed for recovery of its isopropyl alcohol content. The washed hydrocarbon is returned to the same reactor or to another similar reactor of the system for further conversion of the propylene contained therein with or without suitable replacement of the reacted propylene with fresh propylene containing hydrocarbon and/or withdrawal of appropriate amounts of hydrocarbon to prevent the accumulation of propane or other diluent in the system.

The amount of washing which will be required in order to obtain the best results varies somewhat depending upon the composition of the hydrocarbon being treated. Thus, for example, with propane-propylene fractions of high propylene content it is not necessary to remove the alcohol as completely as is advisable in the case of fractions of low, for example, less than 15%, propylene content. We have found that even under the most adverse conditions, e. g. where propylene of about 5% concentration is being processed at 15% conversion, only about 7 to 8 equilibrium stages of washing are necessary. Due to the rapidity with which equilibrium is established, the extraction may be easily carried out in packed towers, arranged for countercurrent liquid-liquid extraction, which are of convenient size and easily operated. A 6.5 inch column 22.5 feet high packed with ceramic rings was found to be adequate for the processing of 45,000 pounds of propylene daily using about 6400 pounds of water to reduce the alcohol content from 475 pounds to 50 pounds. This treatment increased the propylene conversion to 15%.

The following examples, showing the effect of various amounts of isopropyl alcohol on the conversion of propylene under analogous hydration conditions further illustrate the advantages of extracting the alcohol before recirculation of the unreacted olefin in accordance with the process of our invention. In all cases the hydrations were carried out using as catalyst 2170 cc. of sulfuric acid of an initial concentration of 4.92%. The converter was an electrically heated, copper lined cylinder in which the depth of catalyst was maintained at 31½ inches by control of the amount of water added with the feed. The converter was maintained at a temperature of about 225° C. and a pressure of 3000 pounds gauge.

| | | | | | | |
|---|---|---|---|---|---|---|
| Initial concentration of propylene in the hydrocarbon, percent | 5.2 | 5.2 | 9.8 | 9.8 | 10.0 | 19.0 |
| Final concentration of propylene in the effluent, percent | 5.0 | 4.8 | 9.5 | 9.0 | 18.4 | 16.8 |
| Alcohol in the feed, mols $C_3H_7OH$/mol $C_3H_6$ | 0.166 | 0.055 | 0.157 | 0.052 | 0.158 | 0.052 |
| Rate of hydrocarbon feed, mols/min | 4.08 | 3.31 | 3.01 | 4.72 | 2.80 | 3.89 |
| Polymer and ether produced as percent of $C_3H_6$ fed | 0.42 | None | 0.16 | 0.37 | 0.44 | 0.4 |
| Conversion to $C_3H_7OH$ as percent of $C_3H_6$ fed | 3.62 | 8.1 | 3.73 | 8.80 | 3.51 | 10.8 |

A comparison of different methods for recovery of the alcohol from the converter effluent gave the following results where propane-propylene fractions containing 28–35% propylene were being hydrated using a 4% aqueous $ZnSO_4.7H_2O$ solution as catalyst at 3000 pounds pressure and 286° C. with a thruput rate of 6 liters per minute.

| | Method | Results |
|---|---|---|
| 1 | The converter effluent was released to atmospheric pressure and cooled by a coil condenser to 20° C. | Method discarded as being inefficient as only a small part of the alcohol was removed. |
| 2 | Same with trap maintained at −40° C. with $CO_2$-alcohol mixture. | Method discarded because a second similar trap showed large amounts of alcohol to be still present in the gas. |
| 3 | Same, uncondensed gases from coil condenser fractionated in a vacuum jacketed packed fractionating column surmounted by a $CO_2$-alcohol cooled reflux head maintained at −48° to −50° C. | Traps placed after the column showed that alcohol was being lost. Also trouble experience with freezing up of column due to entrained water. |
| 4 | Effluent was condensed at 20° C. under 3,000 lbs. pressure and the condensate collected in a pressure receiver at 20° C. and 150 lbs. pressure. The liquid hydrocarbon phase was separated from the aqueous alcohol phase. | Only about 60% of the total alcohol removed with the aqueous phase. |
| 5 | Same, the separated liquid hydrocarbon phase was extracted three times with about ⅓ its volume of water. | Very complete recovery of alcohol. Alcohol content of the extracted hydrocarbon only 0.015 mol per mol of olefin. |

Using extraction methods similar to method 5 for recovery, the following results may be obtained for the hydration of propylene with a 4.5% solution of sulfuric acid at 225° C. and 3000 pounds pressure.

| | | | |
|---|---|---|---|
| Mol percent $C_3H_6$ in the circulating hydrocarbon | 5.2 | 11.4 | 20.8 |
| Weight percent alcohol in hydrocarbon in separator | 0.40 | 1.04 | 2.44 |
| Mols of alcohol per mol $C_3H_6$ in the feed to the converter | 0.023 0.007 | 0.023 0.007 | 0.032 0.021 0.010 |
| Equilibrium stages in scrubber | 3.4 7.5 | 3.2 7.0 | 1.4 2.0 2.9 |
| Conversion percent of $C_3H_6$ fed | 13 15 | 13 15 | 13 14 15 |
| Concentration of alcohol in extract, percent | 2.5 | 6.0 | 8.8 |

It will be evident that our process offers many advantages, particularly with respect to efficiency and plant capacity, over prior methods for hydrating olefins. The smoothness of operation resulting from the use of a feed of constant, low alcohol content, contributes to the reduction of labor and supervision expense. Furthermore our extraction procedure simplifies recovery and purification of the alcohol by reducing the amount of impurities, particularly polymers, ethers, etc. removed therewith.

Our invention is capable of wide variation not only in regard to the olefins which may be hydrated but also with respect to the conditions and methods used for both the hydration and recovery steps. For example, instead of separating the liquid hydrocarbon phase of the condensed effluent from the aqueous alcohol phase present therewith before extraction of the former, the extraction may be carried out in the presence of the aqueous alcohol phase. By this procedure unreacted olefins, polymers and other preferentially hydrocarbon soluble components of the aqueous phase which would be removed therewith in the previously described method of operation are transferred to the liquid hydrocarbon and a source of loss of starting material and of contamination of the product is thus eliminated. The process may be carried out batchwise or intermittently instead of continuously as described. In the hydration of ethylene it is advantageous to add suitable compounds, e. g. inorganic salts such as calcium chloride, to the water used as solvent in order to reduce its freezing point. Preliminary partial condensation of alcohol from the converter effluent may, if desired, be combined with the process of our invention and such condensation stage may be employed to preheat the feed to converter. Other suitable heat exchanges between effluent and feed may be employed to conserve heat in the system. Still other modifications may be made in the process of our invention, which will therefore be understood as not limited to the details of operation described nor by any theory advanced in explanation of the improved results attained, but only by the terms of the accompanying claims in which it is our intention to claim all novelty inherent therein as broadly as possible in view of the prior art.

We claim as our invention:

1. In a process for the catalytic hydration of propylene by reaction with water at a temperature above 100° C. under a pressure greater than the vapor pressure of water at the operating temperature in the presence of a catalytic amount of aqueous sulfuric acid of 2 to 10% of concentration wherein an effluent gas mixture containing isopropyl alcohol, propylene and water is produced, the steps which comprise condensing the resulting mixture into an aqueous liquid phase and a liquid hydrocarbon phase, washing said liquid hydrocarbon phase with sufficient water to reduce the alcohol content thereof to not more than 0.05 mols of alcohol per mol of olefin and returning the washed hydrocarbon to said catalytic hydration.

2. In a process for the catalytic hydration of propylene by reaction with water at a temperature above 100° C. under a pressure greater than the vapor pressure of water at the operating temperature in the presence of an aqueous catalyst for the hydration of olefins wherein an effluent gas mixture containing isopropyl alcohol, propylene and water is produced, the steps which comprise condensing the reaction products, separating a liquid propylene-containing-hydrocarbon phase in which isopropyl alcohol is present from the condensate, extracting said separated phase with water to remove at least a part of said alcohol therefrom, and hydrating propylene present in the raffinate.

3. In a process for the catalytic hydration of propylene by reaction with water in the presence of an olefin hydration catalyst wherein an effluent gas mixture containing isopropyl alcohol, propylene and water issues from the catalyst chamber, the steps which comprise condensing and stratifying the effluent into an aqueous phase and a liquid hydrocarbon phase containing propylene and isopropyl alcohol, extracting said hydrocarbon phase with sufficient water to reduce the isopropyl alcohol content to between about 0.003 and about 0.030 mols of alcohol per mol of propylene and introducing the extracted hydrocarbon into a hydrating catalyst chamber.

4. In a process for producing a preferentially water soluble alcohol by catalytic hydration of the corresponding normally gaseous olefin wherein a solution of said alcohol in said olefin in the liquid state is obtained, the steps of subjecting said solution to countercurrent liquid-liquid extraction with water to reduce the alcohol content to not more than 0.03 mols per mol of said olefin and further hydrating the extracted olefin.

5. In a process of catalytically hydrating a normally gaseous olefin at a temperature and pressure at which a gaseous mixture comprising said olefin, the corresponding alcohol and water is obtained as the initial product, the steps of cooling said mixture sufficiently to form an aqueous alcohol phase and a liquid hydrocarbon phase, extracting the alcohol containing hydrocarbon phase, under sufficient pressure to maintain hydrocarbon and alcohol present in the liquid phase, with water to remove alcohol therefrom, and returning the extracted olefin for further hydration.

FRANKLIN A. BENT.
RUSSELL W. MILLAR.
SIMON N. WIK.